(12) United States Patent
Kuhn et al.

(10) Patent No.: US 9,097,173 B2
(45) Date of Patent: Aug. 4, 2015

(54) INTERNAL COMBUSTION ENGINE

(71) Applicant: DAIMLER AG, Stuttgart (DE)

(72) Inventors: Thomas Kuhn, Stuttgart (DE); Nils Brinkert, Stuttgart (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 13/646,696

(22) Filed: Oct. 6, 2012

(65) Prior Publication Data

US 2013/0047606 A1  Feb. 28, 2013

(30) Foreign Application Priority Data

Apr. 7, 2010 (DE) .......................... 10 2010 014 096

(51) Int. Cl.
| | | |
|---|---|---|
| *F02D 23/00* | (2006.01) | |
| *F03B 1/04* | (2006.01) | |
| *F01D 1/02* | (2006.01) | |
| *F03D 1/04* | (2006.01) | |
| *F02B 37/02* | (2006.01) | |

(52) U.S. Cl.
CPC ............... *F02B 37/02* (2013.01); *F02B 37/025* (2013.01); *Y02T 10/144* (2013.01)

(58) Field of Classification Search
CPC ....... F01D 9/026; F01D 25/26; F01D 17/143; F01D 17/14; F01D 17/141; F01D 17/165; F01D 17/167; F05D 2220/40; F02B 37/02; F02B 37/025; F02B 37/24; F01N 13/107; F03B 3/186; F04D 17/165; F02F 1/4264; Y02T 10/144
USPC ......... 60/602, 605.1; 415/192, 203, 204, 205, 415/44–45, 208.2–208.3
See application file for complete search history.

(56) References Cited

U.S. PATENT DOCUMENTS

| | | | | |
|---|---|---|---|---|
| 1,529,632 | A * | 3/1925 | Nagler | 415/165 |
| 1,879,561 | A * | 9/1932 | Smith | 415/208.3 |
| 2,390,506 | A * | 12/1945 | Alfred Buchi | 415/184 |
| 2,635,849 | A * | 4/1953 | Alfred Buchi | 415/184 |
| 2,764,944 | A * | 10/1956 | Lawrence | 415/204 |
| 4,008,010 | A * | 2/1977 | Fauconnet | 417/405 |

(Continued)

FOREIGN PATENT DOCUMENTS

| | | | |
|---|---|---|---|
| DE | 39 43 705 A1 | 7/1993 | |
| DE | 42 42 494 C1 * | 9/1993 | F01D 17/18 |

(Continued)

OTHER PUBLICATIONS

Translation Description DE 42 42 494 C1, published on Sep. 9, 1993, entire document.*
Translation Description DE 10 2009 012131 A1, pubished on Sep. 9, 2010, entire document.*

*Primary Examiner* — Thai Ba Trieu
*Assistant Examiner* — Jason T Newton
(74) *Attorney, Agent, or Firm* — Klaus J. Bach

(57) ABSTRACT

In an internal combustion engine comprising a turbocharger which includes a turbine which is located in an exhaust tract of the internal combustion engine and to which exhaust gas of the internal combustion engine is applied via an exhaust pipe system of the exhaust tract, the turbine comprises volute passages distributed along the circumference of the turbine wheel and the exhaust gas flows are combined and divided upstream of the turbine into at least two exhaust gas part-flows each of which part-flows is fed to one of the volute passages.

1 Claim, 1 Drawing Sheet

(56) References Cited

U.S. PATENT DOCUMENTS

| | | | | |
|---|---|---|---|---|
| 4,177,005 | A | * | 12/1979 | Bozung et al. ............... 415/128 |
| 4,443,153 | A | * | 4/1984 | Dibelius ....................... 415/151 |
| 6,260,358 | B1 | * | 7/2001 | Daudel et al. ................. 60/602 |
| 6,536,214 | B2 | * | 3/2003 | Finger et al. .................. 60/602 |
| 2005/0056015 | A1 | * | 3/2005 | Fledersbacher et al. ........ 60/602 |
| 2007/0220884 | A1 | * | 9/2007 | Savage et al. .................. 60/602 |
| 2011/0052374 | A1 | * | 3/2011 | Arnold .......................... 415/148 |
| 2013/0104539 | A1 | * | 5/2013 | Sumser et al. ................. 60/602 |
| 2013/0266432 | A1 | * | 10/2013 | Iwakiri et al. ................ 415/204 |
| 2013/0276444 | A1 | * | 10/2013 | Hirth et al. ................... 60/605.1 |

FOREIGN PATENT DOCUMENTS

| | | | |
|---|---|---|---|
| DE | 102 12 675 B4 | 10/2003 | |
| DE | 102004062091 A1 * | 7/2006 | ............... F02C 6/12 |
| DE | 10 2009 012131 A1 * | 9/2010 | ............... F02B 37/22 |
| GB | 1044170 | 9/1966 | |
| JP | 2012 29828 | 10/2010 | |
| WO | WO 03/080999 | 10/2003 | |
| WO | WO 2009012989 A1 * | 1/2009 | ............... F02B 37/18 |
| WO | WO 2009129895 A1 * | 10/2009 | ............... F01D 9/02 |

* cited by examiner

US 9,097,173 B2

INTERNAL COMBUSTION ENGINE

This is a Continuation-In-Part application of pending international patent application PCT/EP2011/000808 filed Feb. 19, 2011 and claiming the priority of German patent application 10 2010 014 096.1 filed Apr. 7, 2010.

BACKGROUND OF THE INVENTION

The invention relates to an internal combustion engine comprising a turbocharger with a turbine having a housing with several volute inlet passages distributed around the circumference of the housing and the engine exhaust gas flow is divided into several partial flows which are supplied to different ones of the turbine inlet passages.

DE 102 12 674 B4 discloses an internal combustion engine comprising a turbocharger, which includes a turbine housing with two volute passages. The volute passages have inlet nozzles which are distributed about the axis of rotation of a turbine wheel accommodated in the turbine housing along a circumference of the turbine wheel and by way of which exhaust gas of the internal combustion engine can be applied to the turbine wheel. This turbocharger however is subject to unnecessary wear.

It is therefore the object of the present invention to provide an internal combustion engine comprising a turbocharger, which is particularly wear-resistant.

SUMMARY OF THE INVENTION

In an internal combustion engine with an exhaust tract comprising a turbocharger which includes a turbine which is located in an exhaust tract of the internal combustion engine and to which exhaust gas of the internal combustion engine is applied via an exhaust pipe system of the exhaust tract, the turbine comprises volute passages distributed along the circumference of the turbine wheel, the exhaust gas flows being divided upstream of the turbine into at least two exhaust gas part-flows, each of which part-flows is fed to one of the volute passages. There are for example two exhaust gas part-flows of which the first is fed to a first volute passage while the second exhaust gas part-flow is fed to a second volute passage which is arranged opposite the first volute passage so as to be supplied to the turbine along its circumference.

The result is a very low loading and therefore very little wear of the bearings of the turbine wheel or an overall rotor bearing structure of the turbocharger, by means of which mounting the turbine wheel, a compressor impeller of a compressor of the turbocharger and a shaft onto which the turbine wheel and the compressor impeller are mounted are supported. in a bearing housing of the turbocharger. This very low loading is due to the fact that resulting forces acting perpendicular to the axis of rotation of the turbine wheel cancel each other out or the resulting forces are at least greatly reduced. An efficiency advantage of the turbine is further obtained by a better conversion of a pulse loading of the turbine wheel, which is accompanied by an efficient pulse charging of the turbocharger.

In an advantageous variant of the invention, the nozzle cross-sections of the volute passages are evenly distributed along the circumference of the turbine wheel. If, for example, two volute passages are provided, which makes the turbine a segmented turbine with two segments, these are advantageously arranged along the circumference of the turbine wheel with an offset of 180°, which results in a very low loading of the bearing arrangement. If more than two volute passages, i.e. segments, are provided, these are arranged in pairs along the circumference of the turbine wheel with an identical angular offset. Alternatively, it may be provided that the nozzle cross-sections of the volute passages are distributed along the circumference of the turbine wheel in an irregular arrangement.

In an arrangement with two volute passages, the nozzle cross-sections may however be arranged at an offset angle other than 180° since in this way, pipe-length differences for the exhaust gas, for example, can be compensated for by means of the exhaust gas pipe system.

In an advantageous variant of the invention, the nozzle cross-sections differ from one another, which may be in terms of size, shape and/or the like. This results in an asymmetrical design of the nozzle cross-sections. As a result, the volute passages can serve different purposes. If two volute passages are provided, one volute passage may for example act as a so-called λ-volute passage, by means of which the combustion air ratio of the internal combustion engine can be adjusted. The other volute passage may for example have a smaller nozzle cross-section, taking over the function of a so-called EGR volute passage (EGR=exhaust gas recirculation). This EGR volute passage supports an exhaust gas recirculation of the internal combustion engine, because by means of the EGR volute passage the exhaust gas can be banked very well, allowing the recirculation of a particularly large volume of exhaust gas from the exhaust train to an intake side of the internal combustion engine.

The volute passages may further have different wrap angles. Preferably however, they have identical wrap angles.

In a further advantageous variant, the internal combustion engine has a plurality of combustion chambers, wherein each exhaust gas of at least two of these combustion chambers can initially be combined downstream of the combustion chambers at at least one collecting point by means of the exhaust gas pipe system and then be divided into the at least two exhaust gas part-flows downstream of the collecting point and upstream of the turbine, each of which exhaust gas part-flows can then be fed to one of the volute passages. This means that the exhaust gas from two combustion chambers is first combined into an overall exhaust gas flow, which is then once again divided and fed to the volute passages. This results in the very low loading of the bearing arrangement as described above, accompanied by minimum wear of the turbocharger.

The internal combustion engine according to the invention further offers the advantage of a greater degree of freedom in the design of the turbine wheel, resulting in lower fuel consumption and therefore in lower $CO_2$ emissions of the internal combustion engine. A further advantage which can be obtained thereby is a better response behavior and thus an at least almost instantaneous provision of a corresponding charge level for a specified torque or a specified power output of the internal combustion engine. The internal combustion engine according to the invention further provides for better rotor dynamics and for a better fatigue strength.

The internal combustion engine can further be operated in a pulse turbocharging mode, because the effect of pulse turbocharging is realized by a volume reduction from the combustion chamber to the exhaust gas pipe system and therefore by a reduction in the exhaust gas-carrying volumes between the combustion chamber and the turbocharger.

The description of the internal combustion engine provided above applies both to a turbine which is supplied with exhaust gas by one stream of the exhaust gas pipe system and to a turbine which is supplied by two or more streams. If the internal combustion engine has a plurality of combustion chambers, for example, wherein the exhaust gas from one part-quantity of this plurality of combustion chambers is or can be combined into a first exhaust gas flow by means of the exhaust gas pipe system and the exhaust gas from the other part-quantity of this plurality of combustion chambers is combined into a second exhaust gas flow downstream of the combustion chambers but upstream of the turbine, the exhaust gas pipe system provides two streams by way of which each one of the exhaust gas flows can be supplied to the turbine. Further downstream but still upstream of the turbine, the first and second exhaust gas flows can then once again be divided into two part-flows, each of which can be or is supplied to a volute passage of the turbine by means of the exhaust gas pipe system. This means that initially two supply volumes for the turbine are divided into four exhaust gas part-flows in the form of the two streams, and each is fed to a volute passage. This principle can easily be applied to a higher number of streams and results in each case in a particularly low loading of the turbocharger bearings and thus in a very low wear of the turbocharger.

Further advantages, features and details of the invention will become more readily apparent from the following description of a preferred embodiment and from the drawings. The features and combinations of features mentioned in the above description and the features and combinations of features described below in the description of the figures and/or shown in the figures alone can be used not only in the specified combination, but also in other combinations or individually, without exiting the scope of the invention.

DESCRIPTION OF AN EXEMPLARY EMBODIMENT

Figure 1:
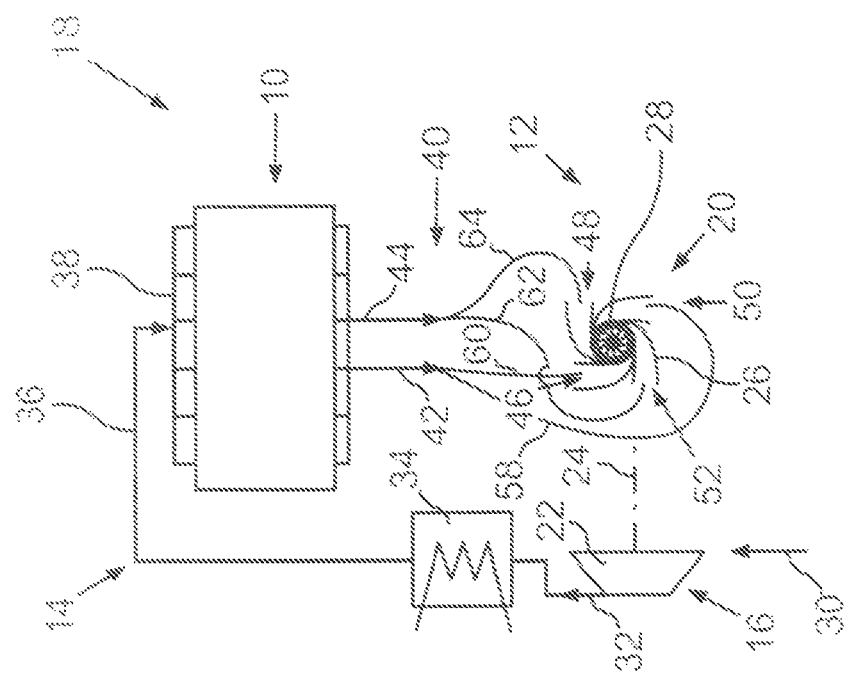
FIG. 1 is a schematic diagram of an internal combustion engine having six cylinders and a turbocharger with a turbine, wherein exhaust gas from each of the cylinders can be combined by means of an exhaust gas pipe system to form a stream, and wherein each of the streams is divided into two part-streams upstream of the turbine by means of the exhaust gas pipe system.

FIG. 1 shows an internal combustion engine 10 comprising a turbocharger 12 which includes a compressor 16 located on an intake side of the internal combustion engine 10 and a turbine 20 located in an exhaust train 18 of the internal combustion engine 10. The compressor 16 comprises a compressor impeller 22 which mounted on to a shaft 24 of the turbocharger 12 for rotation therewith. Likewise connected to the shaft 24 for rotation therewith is a turbine wheel 28 accommodated in a turbine housing 26 of the turbine 20, to which turbine wheel 28 exhaust gas of the internal combustion engine 10 can be applied to drive it. As a result, the turbine wheel 28 drives the compressor impeller 22 via the shaft 24.

As the compressor impeller 22 is driven by the turbine wheel 28, air drawn in by the internal combustion engine 10 according to a directional arrow 30 is compressed and heated in the compression process. This compressed and heated air flows according to a directional arrow 32 through an intercooler 34, by which it is once again cooled. The compressed air then flows according to a directional arrow 36 into an intake plenum 38, where the air is first collected and then fed to the cylinders of the internal combustion engine 10. If the internal combustion engine 10 is designed for direct fuel injection, fuel is injected into the air in the cylinders, followed by combustion of the air/fuel mixture by self-ignition or spark ignition.

The exhaust gas generated in this combustion process is conducted from the cylinders of the internal combustion engine 10 by way of the exhaust gas pipe system 40. As FIG. 1 shows, the exhaust gas from three cylinders of the six-cylinders of the internal combustion engine is initially combined to a stream 42 and 44 respectively by means of the exhaust gas pipe system 40 and fed to the turbine 20. This means that three of the six cylinders supply their exhaust gas to the stream 42 and the other three cylinders supply their exhaust gas to the stream 44. A reduction of exhaust gas-carrying volumes between the cylinders and the turbine 20 for each of the streams 42 and 44 results in the effect of a pulse turbocharging, so that the internal combustion engine 10 is pulse-turbocharged by means of the turbocharger 12.

Figure 2:
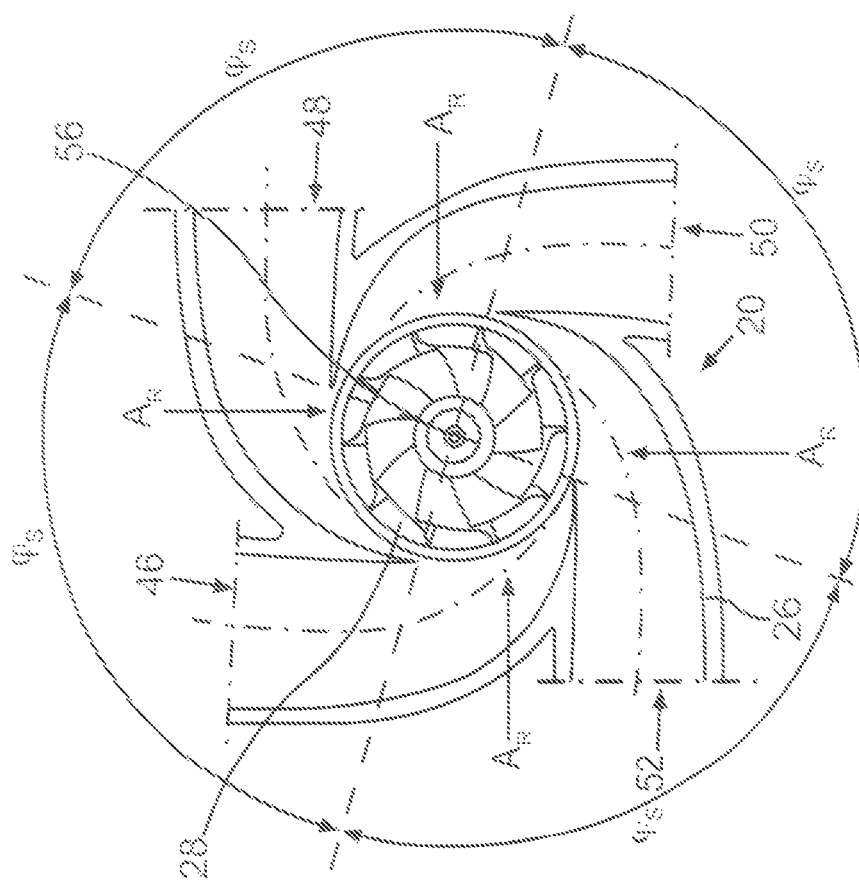
FIG. 2 is a diagrammatic cross-sectional view of the turbine of the turbocharger of the internal combustion engine according to FIG. 1.

If viewed together with FIG. 2 in particular, FIG. 1 shows that the turbine housing 26 of the turbine 20 has four volute passages 46, 48, 50 and 52, each of them having a nozzle with a cross-section $A_R$. The nozzles $A_R$ are distributed about the axis of rotation 56 of the turbine wheel 28 along the circumference of he latter. In addition, exhaust gas from the cylinders can be applied to the turbine wheel 28 via the nozzles, thereby driving the turbine wheel.

For a particularly low loading of the bearings for the compressor impeller 22, the shaft 24 and the turbine wheel 28, the exhaust gas drawn from the cylinders through the exhaust gas pipe system 40 and then combined to the streams 42 and 44 respectively can be divided into two exhaust gas part-flows 58 and 60 or 62 and 64 respectively, each of which can be fed to one of the volute passages 46, 48, 50 and 52 by means of the exhaust gas pipe system. This means that the four exhaust gas part-flows 58 and 60 or 62 and 64 respectively are formed by dividing the streams 42 and 44, wherein the exhaust gas part-flow 58 can be supplied to the volute passage 50, the exhaust gas part-flow 60 to the volute passage 46, the exhaust gas part-flow 62 to the volute passage 52 and the exhaust gas part-flow 64 to the volute passage 48. As the nozzles $A_R$ of the volute passages 48 and 52 and of the volute passages 46 and 50, which are supplied with exhaust gas from the streams 42 and 44 respectively, are arranged at least substantially opposite one another, forces acting at right angles to the axis of rotation 56 almost completely cancel each other out owing to the force of the exhaust gas. This results in a very low loading of the bearings and therefore in a very low wear of the turbocharger 12.

Each of the volute passages 46, 48, 50 and 52 has a wrap angle $\phi_s$, which angles may be identical or different. The nozzle cross-sections $A_R$ may also differ from one another or be asymmetric in shape and/or cross-section. The nozzles do not have to be distributed evenly along the circumference of the turbine wheel 28 either. An uneven distribution may for example be advantageous to compensate for exhaust pipe-length differences.

LIST OF REFERENCE NUMBERS

10 Internal combustion engine
12 Turbocharger
14 Intake side
16 Compressor
18 Exhaust train
20 Turbine
22 Compressor impeller
24 Shaft
26 Turbine housing 28 Turbine wheel
30 Directional arrow
32 Directional arrow
34 Intercooler
36 Directional arrow
38 Intake plenum
40 Exhaust gas pipe system
42 Stream
44 Stream
46 Volute passage
48 Volute passage
50 Volute passage
52 Volute passage
56 Axis of rotation
58 Exhaust gas part-flow
60 Exhaust gas part-flow
62 Exhaust gas part-flow
64 Exhaust gas part-flow
$A_R$ Nozzle cross-section
$\phi_s$ Wrap angle

What is claimed is:

1. An internal combustion engine (10) including
an exhaust tract (18) and a turbocharger (12) with a turbine (20) located in the exhaust tract (18) of the internal combustion engine (10) and having a turbine wheel (28) disposed in a turbine housing to which exhaust gas of the internal combustion engine (10) is applied, the exhaust tract (18) comprising an exhaust gas pipe system (40) with at least one discharge line (44, 42) connected to the turbine (20) and the turbine (20) having at least two pairs of volute turbine inlet passages (46, 48, 50, 52), each of the at least two pairs of volute turbine inlet passages (46, 48, 50, 52) having equally sized inlet nozzle areas ($A_R$) arranged circumferentially distributed about an axis of rotation of the turbine wheel (28) so as to be arranged opposite each other via which inlet nozzle areas ($A_R$) the exhaust gas is directed onto the turbine wheel (28), the exhaust gas being discharged from the internal combustion engine (10) via the at least one discharge line (44, 42) which is divided upstream of the turbine (20) into pairs of exhaust gas part-flows (58, 60, 62, 64), which are fed, by way of the exhaust gas pipe system (40), to the equally sized circumferentially oppositely arranged at least two pairs of volute turbine inlet passages (46, 48, 50, 52), all inlet nozzle areas ($A_R$) being provided with the same vane structures directing the exhaust gas from each pair of exhaust gas part-flows onto the turbine wheel (28) in opposite directions, whereby any radial forces generated by the impact of the exhaust gas on the turbine wheel (28) cancel each other.

* * * * *